3,351,857
CIRCUIT FOR DETERMINING THE FREQUENCY OF OCCURRENCE OF RANDOM NOISE EXCURSIONS IN AN INTELLIGENCE SIGNAL
John Guillen, 115 E. Iris St., Oxnard, Calif. 93030, and Dennis W. Johnson, 878 Empire Ave., Ventura, Calif. 93003
Filed Feb. 26, 1964, Ser. No. 347,622
1 Claim. (Cl. 324—103)

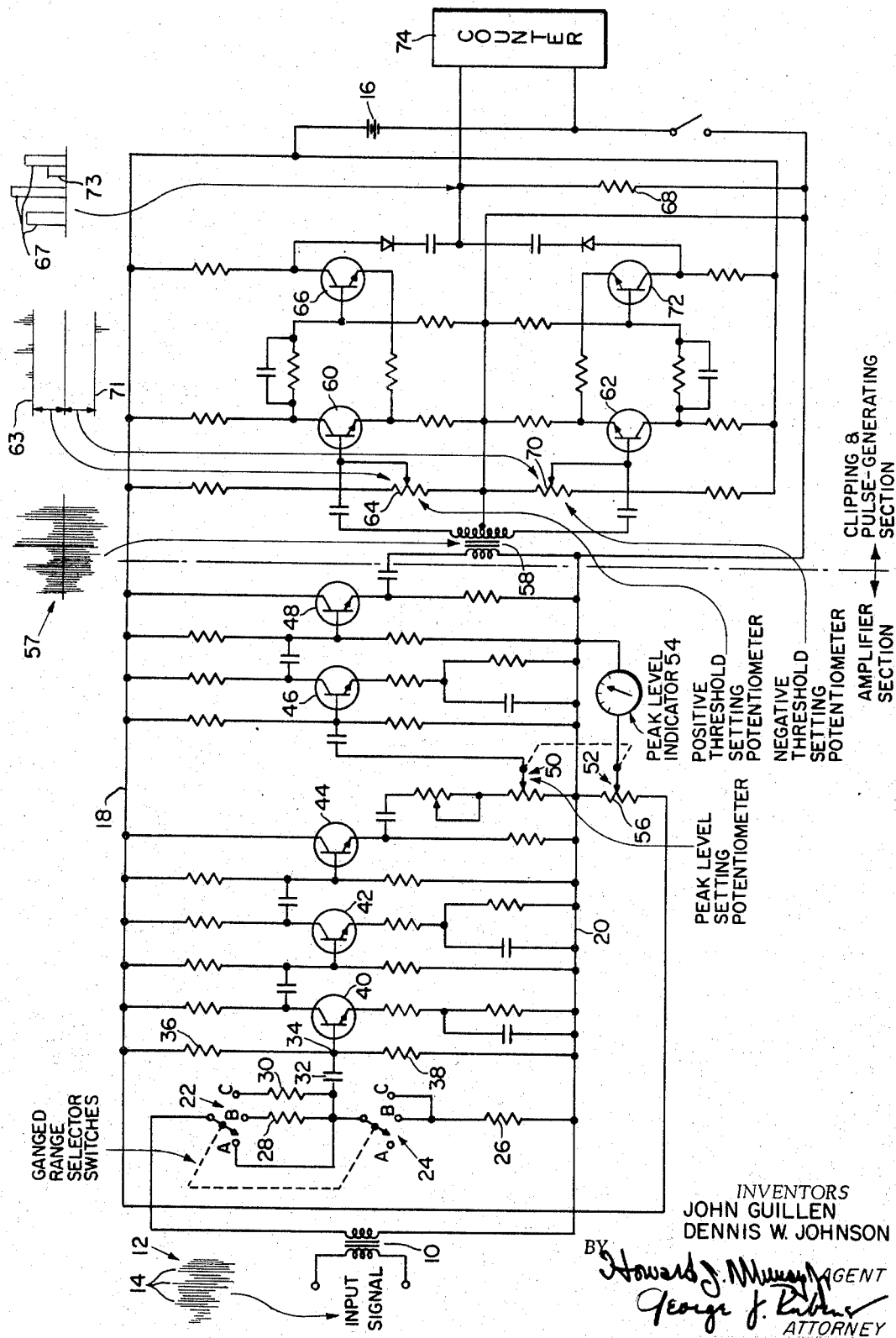

The invention described herein may be manufactured and used by or for the Government of the United States of America for governmental purposes without the payment of any royalties thereon or therefor.

The present invention relates to a device for ascertaining the density, or frequency of occurrence, of low-level noise impulses when present in a transmission line or other electrical circuit.

There are many methods known in the prior art for measuring the signal-to-noise ratio in an information-translating network, such as by a determination of the root-mean-square (RMS) value of a purely random noise signal. When this ratio has been obtained, a number of important characteristics, such as the sensitivity, of a wave-signal translating arrangement can be evaluated. In practice, a meter is customarily utilized to measure the RMS value of the noise-signal output of the circuit in order to compare it with measured signal levels obtained at the input terminals thereto. However, this method is not necessarily accurate, especially where the frequency of occurrence of the noise impulses varies over a wide range.

One of the obvious expedients for obtaining the desired results (if the noise is of a regularly-recurring nature) is to employ a cathode-ray oscilloscope for tracing the amplitude-time characteristics of the signal, but it is not always possible to have available an oscilloscope, the screen of which is correctly calibrated to yield the required ratios directly from the signal patterns traced thereon. Without such a calibration, strict reliance cannot be placed upon the results obtained.

The problem of noise is of special significance when it arises in systems utilized for the transmission of data representing the performance characteristics of missiles and space vehicles. This data is practically without exception in the form of digital signals, mainly short-duration pulses, and these pulses are particularly susceptible to distortion or masking by random noise, or other spurious energy, which may be picked up between the point at which the signals are generated and the point at which they are received. A requirement thus exists for some method of determining not only the magnitude of these noise signals but also the frequency at which they occur. This would permit an evaluation to be made of the transmission network itself from the standpoint of whether or not its performance was satisfactory, or whether it should be repaired or replaced. In other words, the need for measuring not only peak amplitude of the input noise but also its density is extremely important.

One environment in which the above-stated problem is present is where a particular region is to be electronically surveyed in order to determine whether or not a missile launching operation should be carried out. Clearly, the inability of any transmission line to convey data under such circumstances would pose a serious threat not only to property but also to launching personnel. Similarly, transmission lines are frequently associated with the "destruct" aspect of such missile and rocket launchings, and failure of such a line to perform its assigned function can result in the missile or rocket continuing on a trajectory which could cause extreme property damage or even loss of life.

While the measurement of impulse noise, especially at low levels, normally requires much laboratory equipment, time, and trained personnel, a way has been found to carry out this operation in the field with relatively simple apparatus. All of the presently-known amplifiers, impact meters, peak-reading vacuum-tube volt meters (VTM) and oscilloscopes are generally inadequate for field use, since they primarily measure only the peak amplitude of the noise impulses and not the frequency thereof. Since it is desirable in many cases to know the number of times that a noise impulse occurs within a given period, the present concept incorporates means for counting the number of such noise impulses which exceed a predetermined amplitude level and, if desired, recording this data for future evaluation.

One object of the present invention, therefore, is to provide an improved system for ascertaining the density, or frequency of occurrence, of low-level noise impulses when present in a transmission line or other electrical circuit.

Another object of the invention is to provide a device for measuring the number of peak noise impulses in a signal by amplifying the signal, passing only those portions of the impulses which exceed a certain threshold value in either or both directions of polarity, and then counting the number of portions so passed.

An additional object of the invention is to provide an apparatus for determining the transmission efficiency of an electrical network from the standpoint of its ability to convey information in the presence of low-level noise or other spurious energy.

Other objects, advantages and novel features of the invention will become apparent from the following detailed description thereof when considered in conjunction with the accompanying drawing, the single figure of which is a schematic circuit diagram of a preferred form of noise-measuring apparatus designed in accordance with the principles of the present invention.

Referring now to the circuit of the drawing, there is shown a noise-measuring network especially adapted to operate without external power. It consists primarily of two portions one of which functions to amplify an input signal, and the other portion of which is adapted to pass in the form of pulses only those portions of the amplified signal which exceed a predetermined amplitude in either direction of polarity. The output of the system thus consists solely of high-amplitude noise excursions which can be readily counted to determine their frequency of occurrence.

To accomplish the above objective, the circuit of the drawing incorporates a transformer 10 across the primary winding of which is impressed a signal having a waveform such as represented by the reference numeral 12. This signal 12 contains a number of high-amplitude excursions 14 indicative of noise or other spurious disturbances originating in or picked up by a transmission line from whch the signal 12 is derived between the pont at which the signal data is generated and the point at which the measuring apparatus of the present invention is located.

Before proceeding further with a description of the operation of the illustrated circuit, it might be mentioned that no external power source is utilized. Only a battery 16 is employed, the positive terminal of which is connected to a bus line 18, and the negative terminal of which is connected to a bus line 20. In parallel relationship with the secondary winding of transformer 10 is a pair of ganged range-selector switches 22 and 24. Each of these switches possess three operative positions, identified by the characters A, B and C in the drawing. The series switches 22 and 24 are in turn connected in series with a resistor 26 so that the entire assembly 22, 24 and 26 is electrically shunted across the transformer 10.

As will subsequently appear, the function of the ganged switches 22 and 24 is to select a particular range over which the illustrated noise-measuring network will be effective. To bring this about, the signal output of the transformer 10 will pass through the switches 22 and 24 without attenuation when the two switches are in position A. However, in position B, a resistor 28 is inserted in series with the signal to drop its amplitude to a degree determined by the resistance value. The same comment applies to position C of the switches, where a further resistor 30 is located the value of which differs from that of resistor 28. From switch 24 the signal which contains the noise impulses is applied through a capicator 32 to a point 34 intermediate two further resistors 36 and 38 to the base electrode of a transistor 40 which forms part of the first stage of amplification in the illustrated system.

Inasmuch as the five transistorized amplifier stages 40, 42, 44, 46 and 48 of the disclosed system are largely conventional in nature, they will not be described in detail, except to mention that they are set up with the emitter electrode of each stage being connected to the negative bus line 20 through one or more impedances. However, the third amplifier stage 44 is arranged so that the signal developed in the output thereof appears across the resistance element of a peak-level-setting potentiometer 50 the movable element of which picks off a portion of the output signal voltage for application to the transistor base electrode of the following amplifier stage 46. The potentiometer 50 is ganged to a further potentiometer 52 the movable element of which is connected to the negative bus line 20 through a peak level indicator 54, which may comprise a conventional voltmeter. It will be noted that the resistance element 56 of the potentiometer 52 is connected directly across the bus lines 18 and 20 so as to receive the full voltage of the battery 16. If the exact voltage of this battery is known, and the indicator 54 properly calibrated, then the reading obtained thereon will be indicative of the setting of the movable element of the potentiometer 52. Since this potentiometer is ganged to the peak-level-setting potentiometer 50, the reading on the indicator 54 will also yield information as to the amplitude characteristic of the signal being applied to the base electrode of the amplifier 46. As will later appear, manual adjustment of the ganged potentiometers 50 and 52 will determine the amount of amplification provided by the stages 40 through 48, and this in turn will indicate the degree to which the input signal must be increased in magnitude in order to appear in the output of the illustrated noise-measuring network.

It should be noted in this connection, however, that the ganged potentiometers 50 and 52 operate in conjunction with the ganged range-selector switches 22 and 24 so that, if no output is developed from the network when the potentiometers 50-52 are manually operated from zero to maximum, then the ganged selector switches 22 and 24 are set to their next position wherein less resistance is inserted in series with the input signal. A reading should then be obtained upon the indicator 54, but, if such is not the case, then the range switches 22–24 are operated to their final setting where the signal directly passes therethrough. In other words, the switches 22–24 determine the range of signal amplitude being investigated, while the potentiometers 50–52 determine the amount of amplification necessary to produce discernible noise impulse peaks within the particular range so selected.

The amplified signal 57 which appears in the output of the final amplifier stage 48 is applied to a clipping network through a coupling transformer 58, the secondary winding of which is center-tapped as shown in the drawing and connected to the negative bus line 20. Consequently, positive excursions of the amplified signal alternately appear on the upper end of the secondary winding, and are applied to the base electrode of a normally non-conductive transistor 60. In similar fashion, negative excursions of the amplified signal as they alternately appear at the lower end of the secondary winding of transformer 58 are applied to the base electrode of a further normally non-conductive transistor 62. Such negative excursions may exceed in amplitude the potential of the bus line 20. The arrangement of the transistors 60 and 62 is such that the former passes only those positive portions of the applied signal which exceed a certain threshold level 63. This level is established by the setting of a potentiometer 64 which acts to apply a bias voltage to the base electrode of the transistor 60, and this bias voltage maintains transistor 60 cut off until the input signal is sufficiently positive to exceed this bias, at which time the transistor conducts. A one-shot trigger or gating transistor 66 is energized by the output of transistor 60 when the latter conducts the trigger transistor 66 developing an output pulse 67 across a load resistor 68.

In similar fashion, the clipping transistor 62 is biased by a voltage supplied to the base electrode thereof from the manually-adjustable threshold-setting potentiometer 70. Here again, transistor 62 is non-conductive until the application thereto of a negative-going signal from transformer 58 the magnitude of which exceeds the threshold 71 established by the potentiometer setting. Conduction of the transistor 62 causes a one-shot trigger transistor 72 to conduct, and an output pulse 73 therefrom appears across the same load resistor 68 as that to which the output of the trigger 66 is applied. A counter circuit 74 receives the pulses 67 and 73 developed across the load resistor 68, and counts only the leading edge of each pulse, so that the number of times the signal amplitude exceeds the clipping level of transistors 60 and 62 is registered rather than the duration of each such amplitude excursion, since the latter information is not important insofar as the objectives of the present invention are concerned.

Summarizing the above, therefore, it will be recognized that when a positive pulse is applied across the primary of transformer 58, the upper terminal of the secondary winding may be either positive or negative depending upon the nature of the transformer. In the example being described, however, the arrangement is such that a positive pulse across the primary causes the upper terminal of the secondary to go positive. When this occurs, the lower terminal will be rendered negative with respect to the center tap which is connected to the negative bus line 20. Transistor 60 will now conduct provided the positive signal is sufficiently positive to exceed the threshold determined by the setting of potentiometer 64. The signal applied to the base of the transistor 62 is negative, rendering transistor 62 non-conductive. On the other hand, when a negative pulse is applied across the primary of transformer 58, the upper terminal of the secondary goes negative and transistor 60 is rendered non-conductive. Transistor 62 now conducts provided the signal applied to its base is sufficiently positive to exceed the threshold determined by the setting of potentiometer 70.

It will be noted that the two threshold-setting potentiometers 64 and 70 are individually adjustable rather than being ganged together. This permits a different clipping level to be established for the positive excursions of the input signal from that which is established for the signal's negative excursions. This is desirable since in certain cases it might be advantageous to emphasize those characteristics of a particular type of noise variation which is unequal with respect to polarity variations—that is, the signal may contain more pronounced noise impulses in one direction of polarity than in the other.

Obviously many modifications and variations of the present invention are possible in the light of the above teachings. It is therefore to be understood that within the scope of the appended claim the invention may be practiced otherwise than as specifically described.

We claim:

A circuit for determining the frequnecy of occurrence in a transmission network of random noise excursions contained in an intelligence signal when such noise excursions exceed a predetermined amplitude level in both directions of polarity, said circuit comprising:

means forming part of said circuit for setting respective threshold amplitude levels in both directions of polarity below which levels no applied energy is passed;

means for applying said intelligence signal in which said random noise excursions appear to said threshold-setting means so that only noise excursions which excursions which exceed the set amplitude levels are passed by the said threshold-setting means;

means operating upon the reception of a noise excursion in either direction of polarity which is passed by the said threshold-setting means to generate a single output pulse for each such passed noise excursion;

means for counting the number of pulses so generated;

said means for setting a threshold in one direction of polarity below which level no applied energy is passed comprising a first transistor biased to cutoff in the absence of an applied voltage variation representative of an intelligence signal containing at least one noise excursion extending in the said one direction of polarity and of an amplitude exceeding the amount by which said first transistor is biased, and said means for setting a threshold in the other direction of polarity comprising a second transistor biased to cutoff in the absence of an applied voltage variation representative of an intelligence signal containing at least one noise excursion extending in the said other direction of polarity and of an amplitude exceeding the amount by which said second transistor is biased; and for setting the bias level of said first transistor independently of the bias level of said second transistor so that the minimum amplitude of the random noise excursions passed by said threshold-setting means in one direction of polarity may vary from the minimum amplitude of the random noise excursions passed by the said threshold-setting means in the other direction of polarity.

References Cited

UNITED STATES PATENTS

| | | | |
|---|---|---|---|
| 2,050,852 | 9/1936 | Moore | 340—253 |
| 2,694,181 | 11/1954 | Lax | 324—103 |
| 2,708,736 | 5/1955 | Creveling et al. | 324—103 |
| 2,752,589 | 6/1956 | DeLong | 340—253 |
| 2,779,869 | 1/1957 | Gerks | 324—77 X |
| 3,157,798 | 11/1964 | Anderson et al. | 307—88.5 |
| 3,191,073 | 6/1965 | Mooney | 307—88.5 |
| 3,214,700 | 10/1965 | Hook | 328—165 |

RUDOLPH V. ROLINEC, *Primary Examiner.*

WALTER L. CARLSON, *Examiner.*

E. F. KARLSEN, G. L. LETT, *Assistant Examiners.*